(12) United States Patent
Agrawal

(10) Patent No.: US 6,985,486 B1
(45) Date of Patent: Jan. 10, 2006

(54) SHARED BUFFER ASYNCHRONOUS TRANSFER MODE SWITCH

(75) Inventor: Jagannath P. Agrawal, Overland Park, KS (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 09/615,675

(22) Filed: Jul. 14, 2000

(51) Int. Cl.
   *H04L 12/28* (2006.01)

(52) U.S. Cl. .................................. 370/395.1; 370/412

(58) Field of Classification Search ................ 370/360, 370/380, 381, 382, 383, 384, 385, 386, 352, 370/390, 395.1, 411, 412, 413, 414
See application file for complete search history.

(56) References Cited

U.S. PATENT DOCUMENTS

| | | | |
|---|---|---|---|
| 5,130,982 A | * | 7/1992 | Ash et al. .................... 370/352 |
| 5,636,210 A | * | 6/1997 | Agrawal ...................... 370/390 |
| 6,151,316 A | * | 11/2000 | Crayford et al. ............ 370/356 |
| 6,501,757 B1 | * | 12/2002 | Kamaraj et al. ........ 370/395.41 |

* cited by examiner

*Primary Examiner*—Huy D. Vu
*Assistant Examiner*—Daniel Ryman
(74) *Attorney, Agent, or Firm*—Blakely, Sokoloff, Taylor & Zafman LLP

(57) ABSTRACT

An asynchronous transfer mode switch includes a switching engine with a set of buffer groups having a set of 1-cell buffers where a cell is stored in only one buffer. The number of buffer groups exceeds the number of input ports. The switching engine also comprises a buffer management module, which includes a FIFO memory to maintain a pool of buffer groups that have at least one available buffer and memory to store bit maps for each buffer group and to store a CNT field value for each buffer to indicate which of its buffers are available to store a new cell, and which buffers still contain a cell that have not yet been read by its destination ports. The bit maps and CNT field values are updated during buffer allocation and buffer reads so that the FIFO maintains a current list of all buffer groups having available buffers.

28 Claims, 8 Drawing Sheets

| 0 | 1 | 2 | 3 | 4 | 5 | 6 ... 12 | 13 ... 16 |
|---|---|---|---|---|---|---|---|
| a | $a_m$ | $d_1$ | $d_2$ | $P_1$ | $P_2$ | $S_1 S_2 ... S_7$ | $d_3 ... d_6$ |

FIG. 7A

| 0 | 1 | 2 ... 11 | 12 ... 16 |
|---|---|---|---|
| a | $a_m$ | $B_1$ $B_2$ ... $B_{10}$ | 0 ... 0 |

FIG. 7B ered to as a VPI/VCI pair. The sender provides a destination network address to the ATM network, and the ATM network sets up a virtual circuit identified by a corresponding VPI/VCI pair. The 5 octet header in an ATM cell contains a VPI/VCI pair, but does not contain the source network address nor the destination network address.
SHARED BUFFER ASYNCHRONOUS TRANSFER MODE SWITCH

FIELD

The present invention relates to digital communications, and more particularly, to asynchronous transfer mode switches.

BACKGROUND

Asynchronous Transfer Mode (ATM) technology was developed for broadband ISDN (Integrated Services Digital Network) systems to carry data traffic, such as digitized voice, video, images, and computer generated data. Data traffic in an ATM network is formatted into fixed length packets, called cells. Each cell comprises 53 octets, where 5 octets are header information and the remaining 48 octets are payload data. A fixed cell length of 53 octets was chosen to simplify the hardware and to provide acceptable latency for voice applications.

ATM is a connection-oriented technology, whereby a virtual circuit (connection) is set up between a sender (source) and a receiver (destination). A sender and receiver may be connected to each other by way of one ATM switch, or by several ATM switches connected together. FIG. 1 illustrates an ATM network, where DTE (Data Terminal Equipment) 102, such as computers, send and receive cells by way of ATM switches 104. As indicated in FIG. 1, multiple ATM switches may be connected together to form large networks.

A virtual circuit is identified by the combination of an 8-bit VPI (Virtual Path Identifier) and a 16-bit VCI (Virtual Circuit Identifier). The combination of VPI and VCI is often referred to as a VPI/VCI pair. The sender provides a destination network address to the ATM network, and the ATM network sets up a virtual circuit identified by a corresponding VPI/VCI pair. The 5 octet header in an ATM cell contains a VPI/VCI pair, but does not contain the source network address nor the destination network address.

The particular format of a cell depends upon whether a cell is transferred from switch to switch, or from user (DTE) to switch. The connection between two ATM switches differs slightly from the connection between a DTE and an ATM switch. The interface between a DTE and an ATM switch is referred to as a UNI (User-to-Network Interface), and the interface between two ATM switches is referred to as a NNI (Network-to-Network Interface). The 5 octets making up a UNI header are illustrated in FIG. 2.

When considered as part of a communication protocol stack, ATM may be viewed as a two layer protocol comprising a data link layer and a physical layer, where the data link layer portion is often referred to as the ATM layer. For example, FIG. 3 illustrates a protocol stack utilizing TCP (Transmission Control Protocol) layer 302 and IP (Internet Protocol) layer 304. Adaptation layer 306 provides an interface between IP layer 304 and ATM layer 308. Adaptation layer 306 accepts IP datagrams from IP layer 304 having variable length, adds an 8-octet trailer for control information, and breaks the IP datagram with trailer into 48-octet blocks for transmission by ATM layer 308. The adaptation layer at a receiving end, such as adaptation layer 310, reassembles the ATM cells into an IP datagram for processing by IP layer 312.

In the specific example of FIG. 3, two virtual channels denoted as VC5 and VC10 are indicated. Cells are routed along virtual channel VC5 from ATM layer 308 to ATM layer switch 314 and to ATM layer 316. Cells received by ATM layer 316 are provided to IP layer 312 by adaptation layer 310 for switching at the IP layer. Cells from IP layer 312 are provided to adaptation layer 318 for transmission by ATM layer 320 for routing along virtual channel VC10.

With increasing traffic in data networks utilizing ATM technology, there is a need for ATM switches having a simplified architecture, suitable for VLSI (Very Large Scale Integration) implementation.

BRIEF DESCRIPTION OF THE DRAWINGS

FIGS. 7a and 7b illustrate routing tags for a unicast ATM cell and a multicast ATM cell, respectively, according to an embodiment of the present invention.

DESCRIPTION OF EMBODIMENTS

Figure 1:
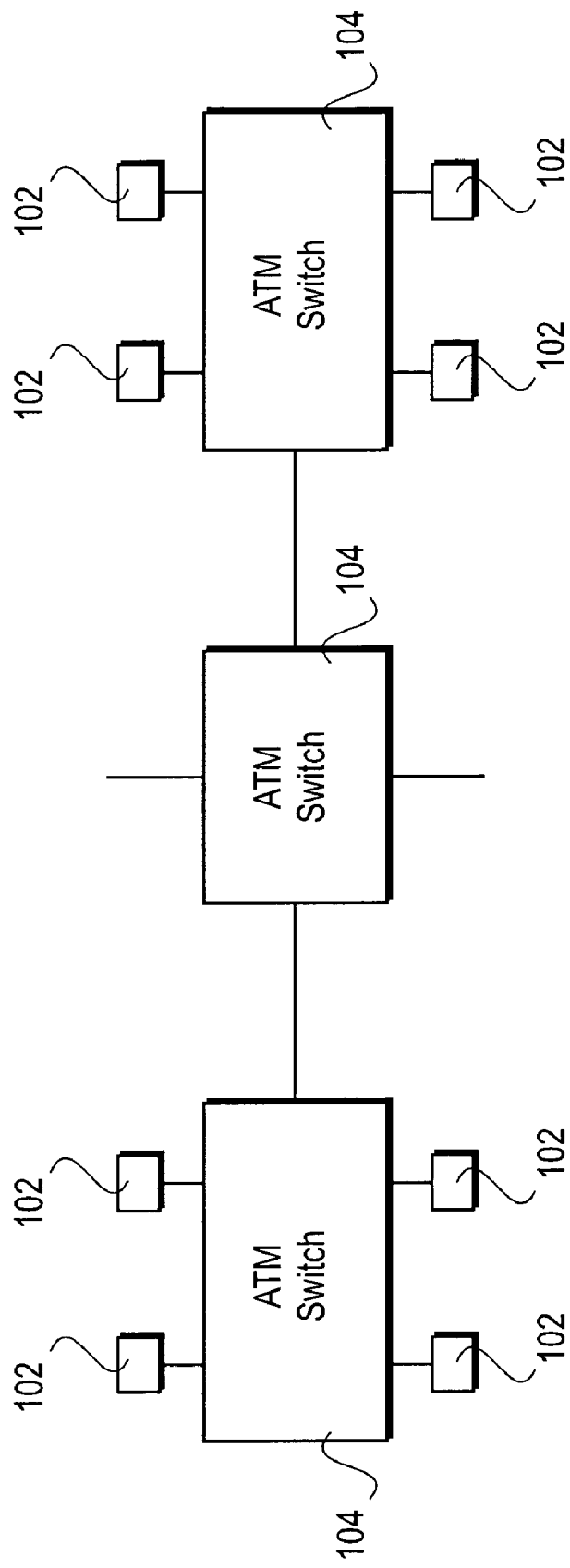
FIG. 1 illustrates a portion of an ATM network made up of multiple ATM switches.
Figure 2:
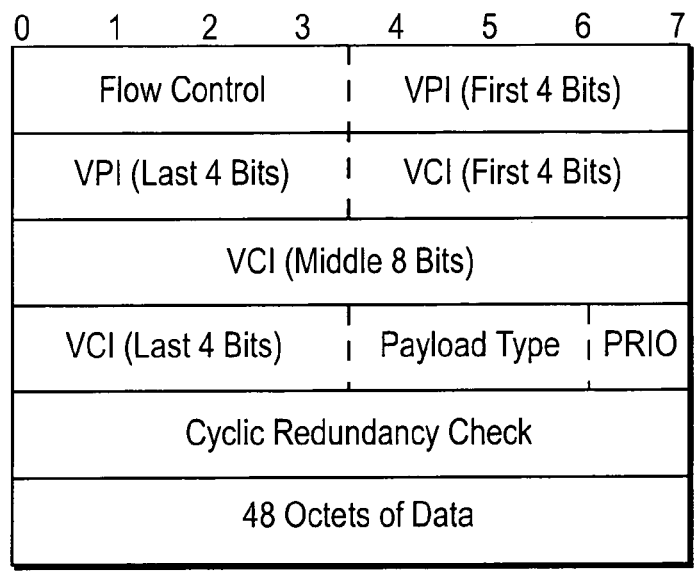
FIG. 2 is a 5 octet header for an ATM User-to-Network Interface.
Figure 3:
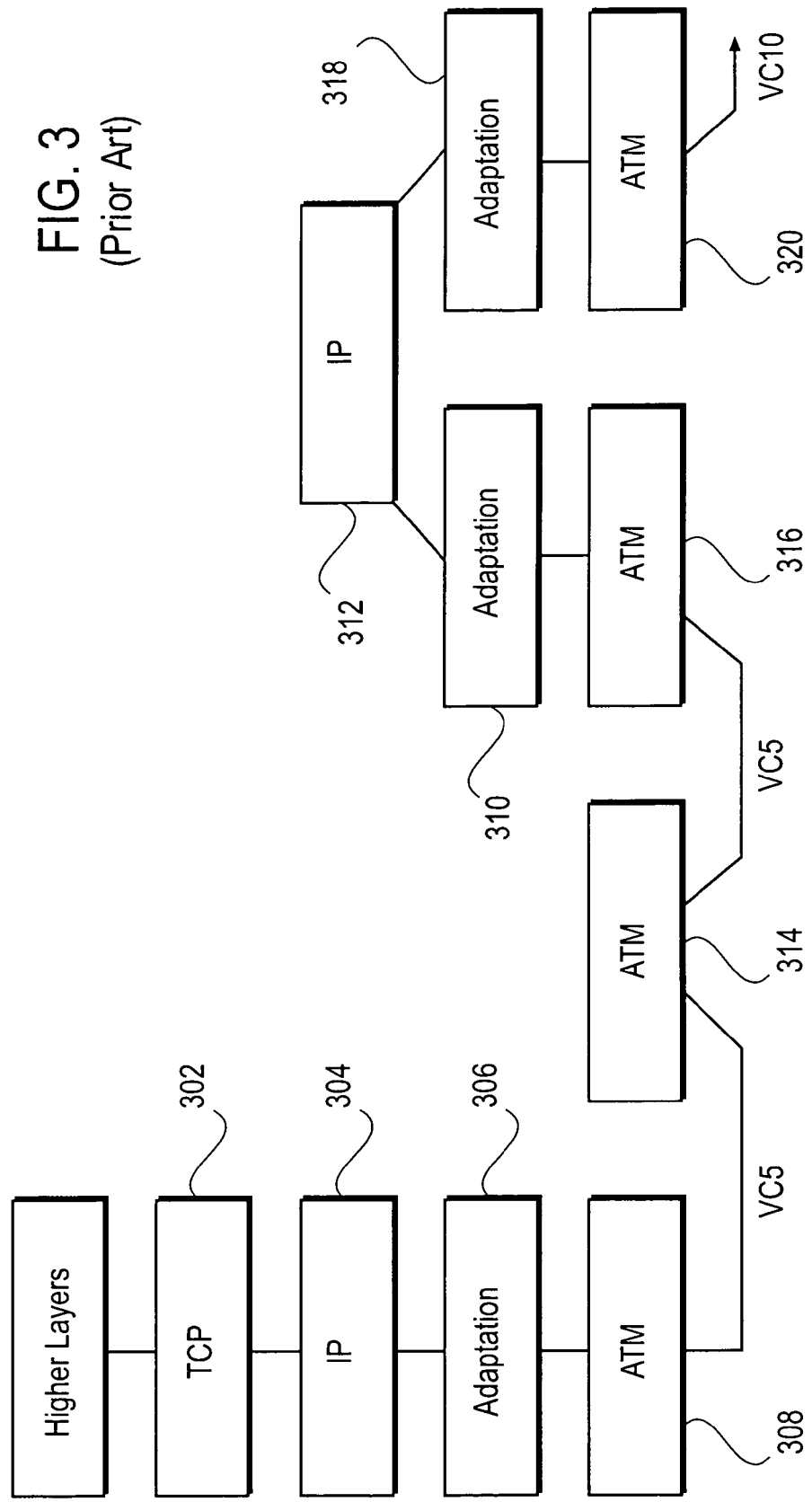
FIG. 3 illustrates a TCP/IP protocol stack with an adaptation layer and an ATM layer.
Figure 4:
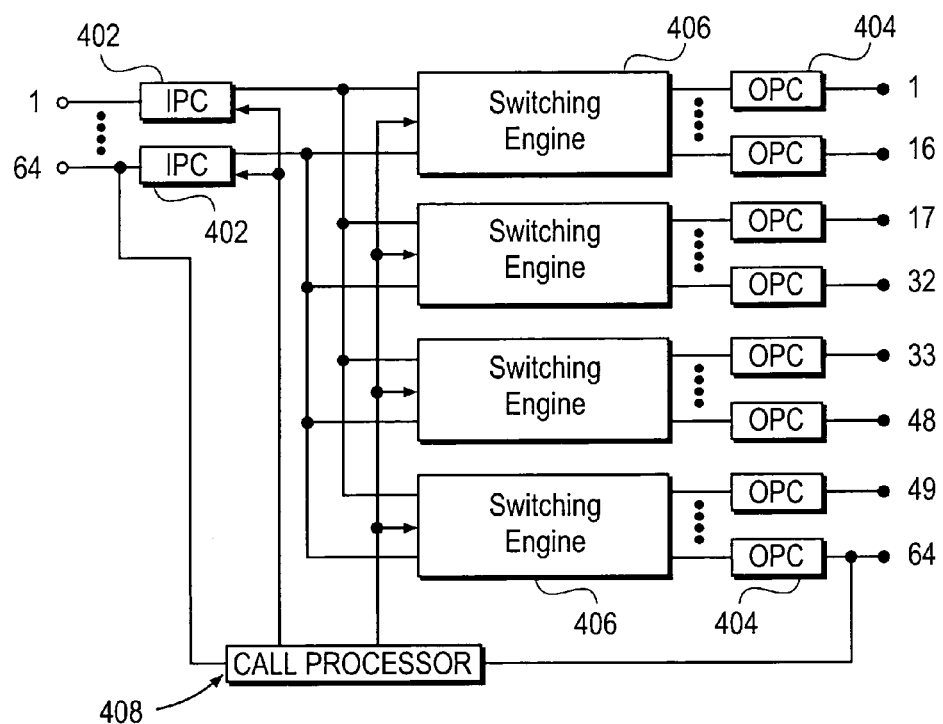
FIG. 4 is an embodiment according to the present invention for a 64×64 ATM switch comprising four Switching Engines.

FIG. 4 provides an embodiment of the present invention for a 64×64 ATM switch. Cells to be switched are provided to IPCs (Input Port Controller) 402. After switching, cells are available at OPCs (Output Port Controller) 404 for use by DTE, another switch, perhaps some other network device, or any combination thereof. In the particular embodiment of FIG. 4, there are 64 IPCs and 64 OPCs. An IPC provides various line termination functions, e.g., cell alignment. An OPC provides various output line termination functions to ensure that the outgoing cells are transmitted properly. Call Processor 408 sets up virtual circuits and performs other call processing functions. Such line termination and call processing functions are well know to those skilled in the art of ATM technology, and a description of such functions is not necessary to practice the embodiments described herein.

SEs (Switching Engine) 406 route cells from IPCs 402 to the appropriate OPCs 404. In the embodiment of FIG. 4, each SE 406 has 64 input ports and 16 output ports. The output of the first IPC 402 is connected to the first input port of each SE 406, the output of the second IPC 402 is connected to the second input port of each SE 406, and so on, with the output of the $64^{th}$ IPC 402 connected to the $64^{th}$ input port of each SE 406. Each output port of a SE 406 is connected to a OPC 404 as shown in FIG. 4. In the embodiment of FIG. 4, four 64×16 Switching Engines are configured to provide a 64×64 ATM switch. However, as will be clear later in this description of embodiments, various numbers of Switching Engines may be configured to provide ATM switches of various sizes.

Figure 5:
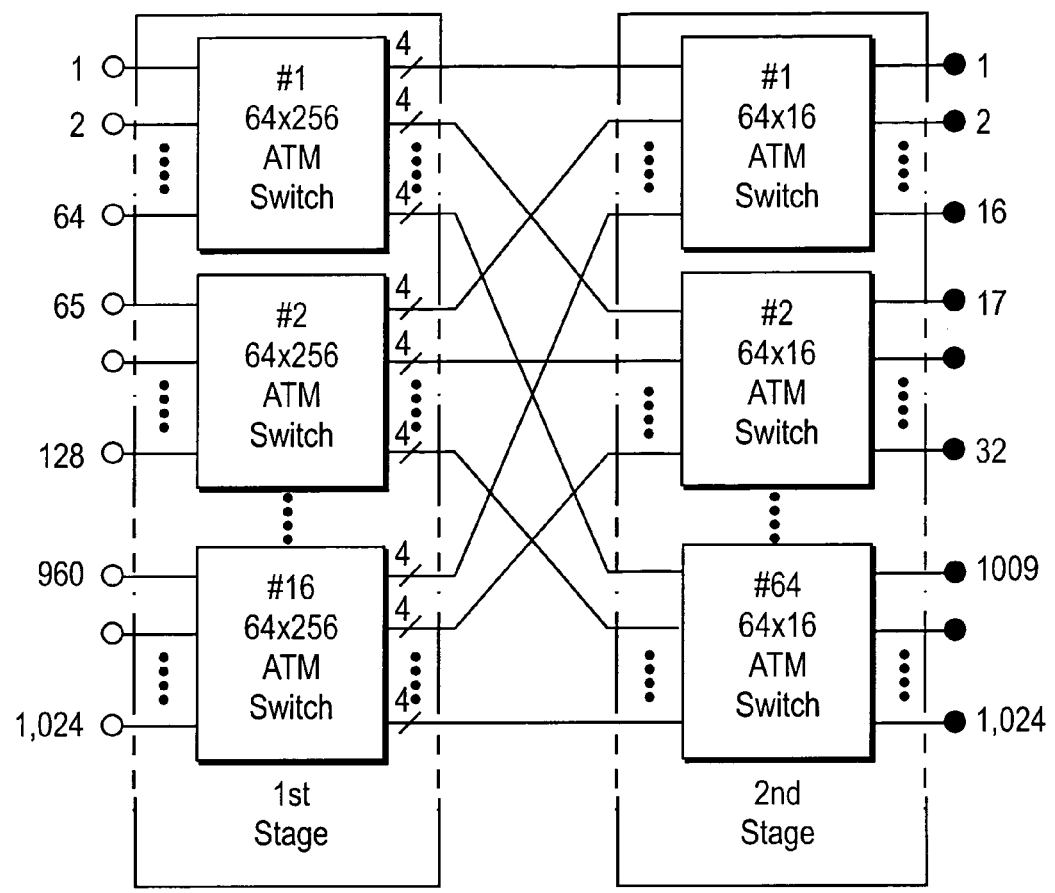
FIG. 5 illustrates a two-stage 1,024×1,024 ATM switch comprising sixteen 64×256 ATM switches in the first stage and sixty-four 64×16 ATM switches in the second stage.

ATM switches may be combined in stages to provide larger ATM switches. For example, FIG. 5 illustrates a two stage 1,024×1,024 ATM switch, where the first stage comprises sixteen 64×256 ATM switches and the second stage comprises sixty-four 64× 16 ATM switches, where the first group of four output ports of each ATM switch in the first stage is connected to the first ATM switch in the second stage, the second group of four output ports of each ATM switch in the first stage is connected to the second ATM switch in the second stage, and so on, where the last group of four output ports of each ATM switch in the first stage is connected to the last ATM switch in the second stage.

The particular choice for the size of a Switching Engine, the number of Switching Engines making up an ATM switch, and the number of ATM switches used to configure larger ATM switches are design parameters that provide various tradeoffs in VLSI circuit design. The embodiments of the present invention are not limited in any way to the sizes of Switching Engines or the number of Switching Engines in an ATM switch as described herein.

Figure 6:
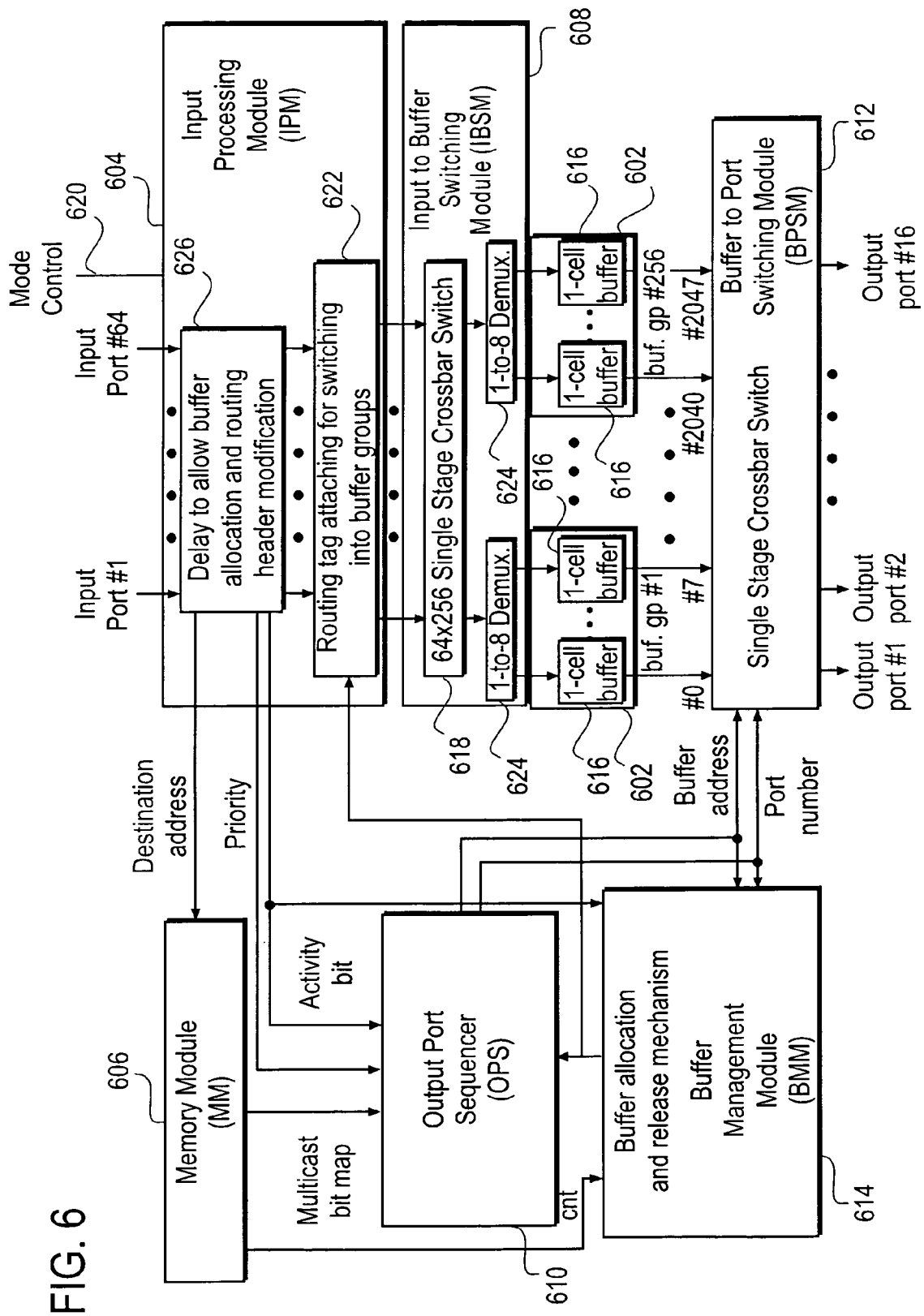
FIG. 6 is a Switching Engine architecture according to an embodiment of the present invention.

An embodiment of Switching Engine 406 is illustrated in FIG. 6. The Switching Engine of FIG. 6 includes 256 Buffer Groups 602, IPM (Input Processing Module) 604, MM (Memory Module) 606, IBSM (Input-to-Buffer Switching Module) 608, OPS (Output Port Sequencer) 610, BPSM (Buffer-to-Port Switching Module) 612, and BMM (Buffer Management Module) 614. Each Buffer Group 602 comprises eight 1-cell buffers 616, for a total buffer size of 2048. Buffers 616 store incoming data cells before they are routed to their respective output ports. The particular embodiment of FIG. 6 has a module size of 64×16 and a buffer size of 2048, but other embodiments may have other sizes.

IPM 604 receives data cells from a plurality of IPCs 402. MM 606 stores destination output port bit maps for unicast and multicast data cells, and priority values associated with multicast data cells. IBSM 608 switches data cells from IPM 604 to buffers 616. OPS 610 stores buffer addresses for each output port and each priority, and provides a set of buffer addresses sequentially in order of priority to be read by each output port. Various Output Port Sequencers are known in the art, and may be used in the embodiments described herein. For example, see U.S. Pat. No. 5,636,210 for a description of an Output Port Sequencer.

BMM 614 allocates buffers when a data cell needs to be stored, and releases buffers when their stored data cells have been read by the one or more output ports that the stored data cells are to be routed. As described in more detail later, BMM 614 allocates buffers by maintaining a pool of available buffers. BMM 614 also provides information to OPS 610 so that queues internal to OPS 610 are properly updated. BPSM 612 switches data cells from Buffer Groups 602 to their respective output ports.

The routing of data cells into buffers is simplified if the number of buffers seen by the Input Processing Module of a switch is equal to or greater than the number of input ports. In this way, multiple data cells need not be written into a single buffer in one clock period. However, selecting the optimal width and depth of the buffers is not trivial. For example, if there is no grouping of buffers and the number of buffers is 2048, then the size of IBSM 608 will be very large. On the other hand, if the number of buffers is equal to the number of input ports, which for the embodiment of FIG. 6 is 64, then the switch may experience significant head-of-the-line blocking and a much larger buffer depth due to inefficient sharing by the output ports. Head-of-the-line blocking may result when one or more Buffer Groups are full even if other Buffer Groups may be more or less empty. Blocking may result in switching delay and loss of priority among incoming data cells.

Consequently, the buffers of the embodiment in FIG. 6 are organized so that the Switching Engine appears to have 256 buffers at the input side and 2048 buffers at the output side. This is accomplished by dividing the 2048 buffers into 256 Buffer Groups, with each Buffer Group 602 including eight individual buffers 616. The Buffer Groups for new data cells are selected sequentially so that each Buffer Group receives only one data cell per time slot, and the first available individual buffer within each Buffer Group receives the data cell during that time slot. All data cells at the input port are routed to distinct Buffer Groups in this manner using point-to-point switching. Switch 618 is a 64×256 crossbar switch used for this purpose. Crossbar switch 618 may be implemented in four planes using four 64×64 crossbar switches. This may be advantageous because it may be difficult to accommodate the entire Switching Engine of FIG. 6 on one VSLI chip.

If four 64×16 Switching Engines are coupled together to form a 64×64 ATM switch as indicated in FIG. 4, then each 64×16 Switching Engine 406 receives all data cells at its 64 inputs, but accepts only those destined for its own group of 16 output ports according to a mode control signal on mode control port 620. For the case of four 64×16 Switching Engines, the mode control signal is 2-bits wide. If the Switching Engine of FIG. 6 is selected by the mode control signal on port 620 to accept data cells, then IPM 604 receives data cells from a plurality of IPCs 402, appends routing tags, and routes the data cells to IBSM 608. In the following description, it is assumed that the Switching Engine of FIG. 6 has been selected by the mode control signal to accept data cells, and the mechanism by which it routes data cells will now be described.

A data cell may be a unicast cell or a multicast cell. Unicast cells are destined for a single destination network address, whereas multicast cells are destined for a plurality of destination network addresses. The ATM layer at the sender's side provides a VPI/VCI pair for a destination network address in the unicast case, and a VPI/VCI pair for a set of destination network addresses in the multicast case.

For a unicast cell, the IPC performs VPI/VCI translation because the VPI/VCI pair at the input to the ATM switch needed to route the cell from its sender to its final destination may be different from the VPI/VCI pair needed at the output to the ATM switch. The IPC also refers to a table mapping VPI/VCI pairs to switch output port addresses, and appends a routing tag to the unicast cell having the appropriate output port address as well as other information.

An embodiment of a routing tag for a unicast cell is illustrated in FIG. 7a. In FIG. 7a, the a bit (bit position 0) is an activity bit that indicates the presence of an ATM data cell. The am bit (bit position 1) is a broadcast indicator bit that indicates whether a cell is unicast or multicast. An am value of 0 indicates the presence of a unicast data cell, whereas an am value of 1 indicates the presence of a multicast data cell.

In FIG. 7a, the $d_1 d_2 d_3 d_4 d_5 d_6$ bits (bit positions 2–3, and bit positions 13–16) comprise a six-bit destination address number to indicate the address of the output port of the 64×64 ATM switch that the data cell is destined for. If $d_1 d_2$ matches with the 2-bit mode control signal on mode control port 620, then the cell is accepted by the corresponding 64×16 Switching Engine. Otherwise, it is ignored. The $P_1 P_2$ bits (bit positions 4 and 5) comprise a two-bit priority field to indicate priority of the data cell. The $S_1 \ldots S_7$ bits (bits 6–12) comprise a seven-bit sequence number field that is used to preserve the first-in-first-out sequence of a plurality of data cells routed by a two-stage or three-stage ATM switch. In one embodiment, $S_1 \ldots S_7$ is set to 0000000 for a single-stage ATM switch. If the ATM switch is a 2 or 3 stage switch, then IPM 604 may have an additional task of arranging the received cells according to the order of this sequence number, depending upon the design of other stages. Some embodiments may not utilize a sequence number field in the routing tags.

For a multicast cell, an IPC does not perform VPI/VCI pair translation because the multicast cell will in general be read by more than one switch output port, and in general not all the outgoing VPI/VCI pairs will be the same for the various output ports reading the multicast cell. Consequently, VPI/VCI pair translation is performed at the OPCs. For the embodiment in FIG. 6, an IPC provides a broadcast channel number for an incoming multicast cell. This broadcast channel number is provided by Call Processor 408. The IPC appends to the incoming multicast cell a routing tag having the broadcast channel number, including other information.

An embodiment of a routing tag for a multicast data cell is illustrated in FIG. 7b. The $B_1 B_2 \ldots B_{10}$ bits (bit positions 2–11) comprise a ten-bit broadcast channel number for obtaining output port bit maps for the plurality of output ports and their corresponding priorities. The remaining bits are set to zeros so that the length of the routing tag is the same as in the unicast data cells.

In a single stage configuration, such as the configuration of FIG. 4, IPM 604 performs two primary functions. First, it receives data cells from IPCs 402 and introduces a time delay (626) in the routing of the data cells for allowing BMM 614 to allocate available buffers to store data cells. Second, it strips the routing tags provided by the IPCs from data cells and sends the am bit and output port address or broadcast channel number to MM 606, sends the activity bit and priority field values to OPS 610, and sends the activity bit to BMM 614. MM 606 receives the am bit and the output port address or broadcast channel number from IPM 604, and reads the corresponding output port bit map from memory. For a multicast cell, MM 606 also reads a CNT value to indicate the number of destination output ports of the multicast cell. The output port bit map and priority bits fields of the data cell routing tag from IPM 604 are provided to OPS 610, and a buffer allocation request is sent to BMM 614 for buffer allocation as described in more detail later.

After buffer allocation is complete, IPM 604 receives modified routing tags from BMM 614 having the output port bit maps and reattaches these tags to the respective data cells (622) for routing them to their respective buffers. In one embodiment, IPM 604 comprises either random access memory (RAM) devices or D-type flip-flops. However, in other embodiments, IPM 604 may comprise other types of memory devices, including FIFO (First-In-First-Out) memories. MM 606 may comprise conventional memory devices such as RAMs, D-type flip-flops, or FIFOs.

IBSM 608 is coupled to IPM 604 for routing data cells to Buffer Groups 602 after IPM 604 has attached new routing tags (622) to the data cells. In the particular embodiment of FIG. 6, IBSM 608 includes 64×256 crossbar switch 618 and 256 1×8 demultiplexers 624 for routing data cells to each of the 256 Buffer Groups 602. Crossbar switch 618 routes the data cells to one of the 256 Buffer Groups 602 based on the Buffer Group portion of the routing tags of the respective data cells. Demultiplexers 624 then route the data cells to the appropriate buffers 616 within the respective Buffer Groups 602. In a four plane implementation, each plane will have a 64×64 crossbar switch such that the first plane performs switching into the first 64 Buffer Groups, the second plane performs switching into second group of 64 Buffer Groups, the third plane performs switching into the third group of 64 Buffer Groups, and the fourth plane performs switching into the fourth group of 64 Buffer Groups.

BPSM 612 is coupled between buffers 616 and the output ports for switching data cells. In one embodiment, BPSM 612 is a single-stage 2048×16 crossbar switch for one-plane implementations, and comprises four 512×16 crossbar switches for four-plane implementations. The use of a crossbar switch is advantageous because it allows multicasting from a single buffer without the use of a copy network. Additionally, a crossbar switch requires less control complexity and does not require speed-up because all output ports may read a buffer simultaneously. Also, the use of a crossbar switch allows BPSM 612 to be expanded linearly if more buffers are added.

Figure 8:
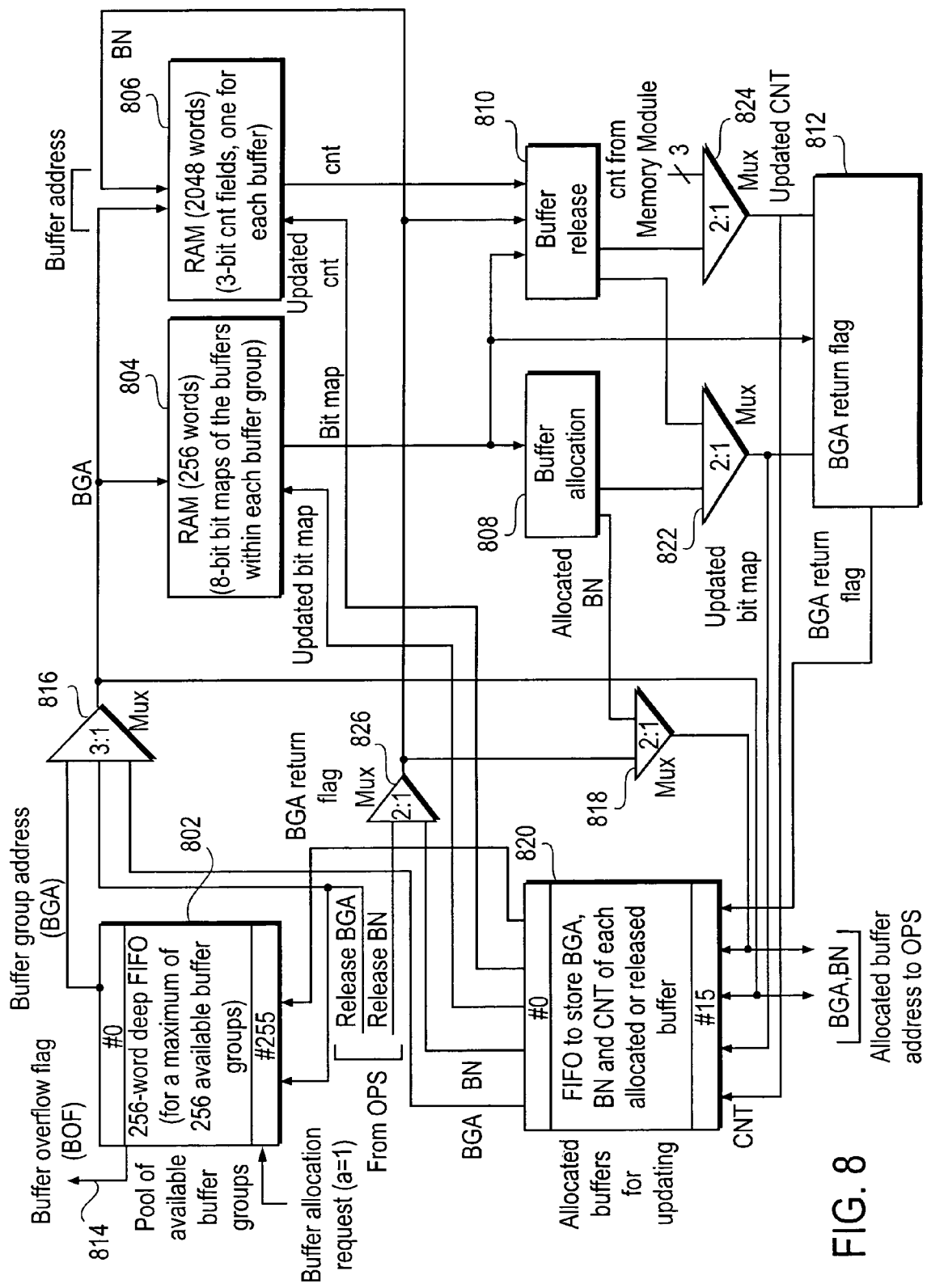
FIG. 8 is a Buffer Management Module architecture for the Switching Engine of FIG. 6 according to an embodiment of the present invention.

An embodiment of BMM 614 is illustrated in FIG. 8. In general, BMM 614 manages the allocation and release of buffers, sends allocated buffer addresses to OPS 610 so that OPS 610 may update its internal queues, and sends allocated buffer addresses to IPM 604 for attaching new routing tags (622) for routing data cells to buffers 616. BMM 614 also generates a buffer overflow flag (BOF) on port 814 in case there are no buffers available.

A pool of available Buffer Group addresses (BGA) is stored in FIFO 802 to point to those Buffer Groups having buffers available for storing new data cells. RAM 804 stores bit maps of all 256 Buffer Groups to indicate which buffers within each Buffer Group are available to store a new data cell. RAM 806 stores the number of destination output ports, designated as CNT, for each of the data cells stored in buffers 616. For a unicast cell, CNT initially is 1, and for a multicast cell, CNT initially will in general be greater than one. In this way, a multicast data cell need only be stored in one buffer. The initial value for the CNT field is obtained from MM 606, where MM 606 stores a table of CNT field values indexed by broadcast channel numbers. Further included in FIG. 8 are Buffer Allocation Module 808, Buffer Release Module 810, and BGA Return Flag Module 812.

The availability of a buffer within a Buffer Group is represented by a bit map stored in RAM 804. In the particular embodiment of FIG. 8, an 8-bit bit map $|b_0, b_1, \ldots b_7|$ is stored for each Buffer Group, so that RAM 804 stores 256 8-bit words. For example, a $b_0$ value of 1 indicates that the first buffer in the Buffer Group is available for allocation. BMM 614 allocates a buffer address from the pool of empty buffers for each incoming data cell and sends the buffer address to IPM 604 as a new routing tag (622). In the embodiment of FIG. 8, the buffer address is an 11-bit address, where the first 8 bits represent the Buffer Group address and the last three bits represent the buffer number within the Buffer Group. If a particular implementation is done in four planes, the first two bits of the 8-bit Buffer Group address represent the plane address and the remaining 6 bits represent the Buffer Group address in the plane.

The buffer allocation process of BMM 614 may be described by the following buffer allocation cycle. At the beginning of a buffer allocation cycle when a new data cell is to be stored in an available buffer, IPM 604 provides to BMM 614 a buffer allocation request with the activity bit a=1. In response to this buffer allocation request, one BGA word is shifted out of FIFO 802, and all other BGA words in FIFO 802 are shifted up one position. (No action is taken by the buffer allocation mechanism if the activity bit a=0.) MUX 816 is set to provide the shifted-out BGA word as an address to RAM 804 so as to obtain the bit map of the available buffers within the Buffer Group pointed to by the shifted-out BGA word. This bit map is provided to Buffer Allocation Module 808.

Buffer Allocation Module 808 allocates the first available buffer within the Buffer Group pointed to by the shifted-out BGA word by setting to 0 the corresponding bit field in the bit map, and by generating a 3-bit buffer number BN for the location of this bit field. MUX 816 and MUX 818 are set to provide the allocated buffer address (BGA, BN) to OPS 610 for queue updating, to IPM 604 for routing (622), and to FIFO 820. MUX 822 is set to provide the updated bit map to FIFO 820. The destination address of the new data cell is used to address MM 606 so as to provide the value of the CNT field corresponding to the new data cell, and MUX 824 is set to provide this CNT field value to FIFO 820.

If the Buffer Group pointed to by the shifted-out BGA word still has at least one buffer available, i.e., at least one of the bits in the bit map is 1, then a BGA Return Flag is generated by BGA Return Flag Module 812 and is stored in FIFO 820 to indicate that the Buffer Group is not full. This flag enables the return of the BGA into the available pool of Buffer Groups in FIFO 802 for reuse. Thus, it is seen that a word is stored in FIFO 820 when a buffer is allocated to a new data cell, where the word comprises the allocated buffer address (BGA, BN), the updated bit map associated with the Buffer Group pointed to by the BGA, the CNT field value associated with the new data cell, and a BGA Return Flag to indicate whether or not the Buffer Group is full.

In the particular embodiment of FIG. 8, FIFO 820 is sized to store 16 words. Consequently, 16 buffer allocation requests may be processed by BMM 614 by shifting out 16 available BGA words from FIFO 802 and storing 16 words in FIFO 820.

After a buffer allocation cycle, BMM 614 begins a buffer update cycle. In the beginning of a buffer update cycle, the first word in location #0 of FIFO 820 is shifted out to provide a buffer address (BGA, BN), updated CNT, an updated bit map, and a BGA Return Flag. All other words within FIFO 820 are shifted up one location. MUX 816 is set to provide the shifted-out BGA to RAM 806 and MUX 826 is set to provide the shifted-out BN to RAM 806 so that the pair (BGA, BN) comprise a complete address to RAM 806 so that the shifted-out updated CNT is stored in RAM 806 at the proper address. MUX 816 also provides the shifted-out BGA as an address to RAM 804 so that the shifted-out updated bit map is stored in RAM 804 at the proper address. The shifted-out BGA is also sent to FIFO 802 provided that the shifted-out BGA Return Flag indicates that the Buffer Group pointed to by the shifted-out BGA has at least one available buffer. The buffer update cycle continues in this fashion, with words shifted out of FIFO 820, and with RAM 804 and RAM 806 updated with updated bit maps and CNT field values.

BMM 614 also manages the release of buffers for reuse. For example, when a data cell stored in a buffer has been read by all its destination output ports, then the buffer is ready to be released for reuse. This release mechanism may be described within the context of the following buffer release cycle. OPS 610 sends a buffer release request to BMM 614 to begin a buffer release cycle. At the beginning of a buffer release cycle, OPS 610 provides BMM 614 the release address (BGA, BN) of a buffer that has been read. MUX 816 is set to provide the release BGA as an address to RAM 804, and together MUX 816 and MUX 826 provide the release address (BGA, BN) to RAM 806. The bit map stored in RAM 804 pointed to by the release BGA is provided to Buffer Release Module 810, and the CNT field value stored in RAM 806 pointed to by the release address (BGA, BN) is provided to Buffer Release Module 810.

Buffer Release Module 810 decrements the CNT field value by one to provide an updated CNT field value. If the updated CNT field value is greater than zero, then the bit map is not updated. If the updated CNT field value is zero, then Buffer Release Module 810 updates the bit map by setting to 1 the bit value in the bit location corresponding to the release BN. MUX 822 is set to send the bit map (possibly updated) provided by Buffer Release Module 810 to FIFO 820. MUX 824 is set to provide the updated CNT field value to FIFO 820.

BGA Return Flag Module 812 receives the updated CNT field value from MUX 824, and also receives the bit map stored in RAM 804 pointed to by the release BGA. If this bit map indicates that all buffers within the Buffer Group pointed to by the release BGA were unavailable, e.g., all bit locations in the bit map are 0, then the release BGA is not in FIFO 802. If, however, the updated CNT field value is zero, then at least one of the buffers within the Buffer Group pointed to by the release BGA is now available for reuse. Consequently, if all the bit locations in the retrieved bit map are 0 and the updated CNT field value is zero, then BGA Return Flag Module 812 sets the BGA Return Flag to 1 to indicate that the Buffer Group pointed to by the release BGA is now available for reuse and its BGA should be stored in FIFO 802. Otherwise, the BGA Return Flag is set to 0 because either the Buffer Group is not available for reuse or a BGA pointing to the Buffer Group is already in FIFO 802.

The buffer release cycle continues in this fashion, with release addresses being provided by OPS 610 after buffer reads, and words being stored in FIFO 820, where a stored word comprises an updated CNT field value, possibly an updated bit map, a release BGA and a release BN, and a BGA Return Flag. The buffer release cycle ends when OPS 610 has sent release requests for all buffers read during the current cycle. After a buffer release cycle finishes, BMM 614 performs a buffer update cycle as described previously so that FIFO 802, RAM 804, and RAM 806 are updated.

FIFO 820 is introduced to provide a delay in updating RAM 804, RAM 806, and FIFO 802. This delay may be advantageous for synchronization purposes. Other embodiments may not include FIFO 820. For such embodiments, RAM 804, RAM 806, and FIFO 802 are updated after each buffer allocation request, or after each buffer release request. That is, the buffer allocation cycle and the buffer update cycle collapse into one process cycle so that only one word instead of 16 words are processed for the embodiment of FIG. 8, and the buffer release cycle and the buffer update cycle collapse into one process cycle so that only one bit map and one CNT field value corresponding to one release address (BGA, BN) are processed instead of the 16 bit maps and 16 CNT field values for the embodiment of FIG. 8.

Those skilled in the art of designing switches appreciate that the functional blocks illustrated in the embodiments may be implemented in a number of ways, and may be realized by application specific integrated circuits (ASIC), firmware, or by software running on one or more programmable processors. Furthermore, although the above description of Switching Engine embodiments falls within the context of ATM switches, the claimed invention need not necessarily be limited to ATM switches, but may find applications to general datagram or packet switching. Many variations may be made to the described embodiments without departing from the scope of the invention as claimed below.

I claim:

1. An asynchronous transfer mode switch comprising:
   a set of m input ports to receive cells;
   a set of n buffer groups, each buffer group comprising a set of buffers, where n>m;
   an input-to-buffer switching module to switch a cell received at one of the m input ports to one of the n buffer groups, wherein the input-to-buffer switch module comprises a single stage m by n crossbar switch;
   a set of output ports;
   an output switching module to switch cells stored in the sets of buffers within the buffer groups to the set of output ports; and
   a buffer management module to maintain a pool of available buffers in which to store the cells, to allocate buffers when cells need to be stored, to release buffers when their stored data cells have been read by one or more of the output ports, and to generate a buffer overflow flag (BOF) if there are no buffers available.

2. The asynchronous transfer mode switch as set forth in claim 1, wherein the output switching module is a single stage crossbar switch.

3. The asynchronous transfer mode switch as set forth in claim 1, wherein the output switching module is a multi-plane crossbar switch.

4. The asynchronous transfer mode switch as set forth in claim 1, wherein each buffer within the sets of buffers is a 1-cell buffer.

5. The asynchronous transfer mode switch as set forth in claim 1, wherein each buffer group comprises a set of k buffers, the input-to-buffer switching module further comprising:
   a set of n 1 by k demultiplexers; and
   at least one crossbar switch to switch a cell received at one of the m input ports to one of the set of n 1 by k demultiplexers;
   wherein each 1 by k demultiplexer is coupled to one of the set of n buffer groups to store each cell switched by the at least one crossbar switch into one buffer.

6. The asynchronous transfer mode switch as set forth in claim 5, wherein each buffer within the sets of buffers is a 1-cell buffer.

7. The asynchronous transfer mode switch as set forth in claim 1, further comprising:
   a first memory device to store n data structures, wherein there is a one-to-one correspondence between the data structures and the buffer groups, wherein each data structure indicates buffers within its corresponding buffer group available for storing new cells.

8. The asynchronous transfer mode switch as set forth in claim 7, wherein the n data structures are bit-maps.

9. The asynchronous transfer mode switch as set forth in claim 7, further comprising:
   a second memory device to store nk CNT field values, wherein there is a one-to-one correspondence between the CNT field values and the buffers, wherein a CNT field value indicates a number of output ports to read its corresponding buffer.

10. The asynchronous transfer mode switch as set forth in claim 1, further comprising:
    a first memory device to store buffer group addresses indicative of which buffer groups have a buffer available to store a new data cell.

11. The asynchronous transfer mode switch as set forth in claim 10, wherein the first memory device is a FIFO such that all stored buffer group addresses in the first memory device are indicative of buffer groups having at least one buffer available to store a new data cell.

12. The asynchronous transfer mode switch as set forth in claim 10, further comprising:
    a second memory device to store n bit maps, wherein there is a one-to-one correspondence between the bit maps and the buffer groups, wherein each bit map indicates buffers within its corresponding buffer group available for storing new cells.

13. The asynchronous transfer mode switch as set forth in claim 12, further comprising:
    a third memory device to store nk CNT field values, wherein there is a one-to-one correspondence between the CNT field values and the buffers, wherein a CNT field value indicates a number of output ports to read its corresponding buffer.

14. The asynchronous transfer mode switch as set forth in claim 13, wherein each buffer group comprises a set of k buffers, the input-to-buffer switching module further comprising:
    a set of n 1 by k demultiplexers; and
    at least one crossbar switch to switch a cell received at one of the m input ports to one of the set of n 1 by k demultiplexers;
    wherein each 1 by k demultiplexer is coupled to one of the set of n buffer groups to store each cell switched by the at least one crossbar switch into one buffer.

15. A switching engine comprising:
    a set of m input ports to receive cells;
    a set of n buffer groups, each buffer group comprising a set of buffers, where n>m;
    an input-to-buffer switching module to switch cells received at the m input ports to the sets of buffers within the set of n buffer groups, wherein each switched cell is stored in one buffer within one buffer group wherein the input-to-buffer switch module comprises a single stage m by n crossbar switch;
    a set of output ports;
    an output switching module to switch cells stored in the sets of buffers within the n buffer groups to the set of output ports; and
    a buffer management module to maintain a pool of available buffers in which to store the cells, to allocate buffers when cells need to be stored, to release buffers when their stored data cells have been read by one or more of the output ports, and to generate a buffer overflow flag (BOF) if there are no buffers available.

16. The switching engine as set forth in claim 15, further comprising:
    a memory device to store buffer group addresses indicative of which buffer groups have a buffer available to store a new data cell, wherein all stored buffer group addresses in the memory device are indicative of buffer groups having at least one buffer available to store a new data cell.

17. The switching engine as set forth in claim 15, further comprising:
    a memory device to store bit maps indicative of buffer states within the set of buffer groups.

18. The switching engine as set forth in claim 15, further comprising:
    a memory device to store CNT field values corresponding to cells stored in the buffers within the set of buffer groups, wherein a CNT field value associated with a stored cell is indicative of a number of output ports to read the stored cell.

19. The switching engine as set forth in claim 15, further comprising:
- a first memory device to store buffer group addresses indicative of which buffer groups have a buffer available to store a new data cell, wherein all stored buffer group addresses in the first memory device are indicative of buffer groups having at least one buffer available to store a new data cell;
- a second memory device to store bit maps indicative of buffer states within the set of buffer groups; and
- a third memory device to store CNT field values corresponding to cells stored in the buffers within the set of buffer groups, wherein a CNT field value associated with a stored cell is indicative of a number of output ports to read the stored cell.

20. The switching engine as set forth in claim 19, wherein the first memory device is a FIFO memory device.

21. A switching engine to switch cells from input ports to output ports, the switching engine comprising:
- a set of n buffer groups wherein each buffer group comprises a set of buffers to store cells;
- an input processing module including m inputs to receive cells, a routine tag attachment unit coupled to attach routing tags to the cells, and a single stage m by n switch coupled to switch the cells received at the m inputs to the n buffer groups, and;
- a buffer management module comprising a first memory device to store pointers to those buffer groups having at least one available buffer to store a new cell;
- wherein the input processing module is coupled to the buffer management module to send buffer allocation requests to the buffer management module, wherein in response to a buffer allocation request the buffer management module shifts out a pointer stored in the first memory device.

22. The switching engine as set forth in claim 21, wherein the number of buffer groups within the set of buffer groups is greater than the number of input ports.

23. The switching engine as set forth in claim 21, wherein pointers shifted out of the first memory device are returned to the first memory device if and only if buffer groups pointed to by the shifted-out pointers have at least one available buffer to store a new cell.

24. The switching engine as set forth in claim 21, wherein each buffer group has a state indicative of which of its buffers are available to store a new cell, the buffer management module further comprising:
- a second memory device to store bit maps indicative of the states of the set of buffer groups.

25. The switching engine as set forth in claim 24, the buffer management module further comprising:
- a buffer allocation module to allocate buffers in response to buffer allocation requests, wherein the buffer allocation module receives a bit map stored in the second memory device at a location indicated by the shifted-out pointer, provides a buffer number pointing to a bit position within the bit map indicative of an available buffer in the buffer group pointed to by the shifted-out pointer to store a new data cell, and updates the bit map by changing the bit position value to indicate a new state of the buffer group pointed to by the shifted-out pointer.

26. The switching engine as set forth in claim 25, wherein in response to the buffer allocation request, the buffer management module sends to the input processing module the shifted-out pointer and the buffer number, and the input processing module attaches a routing tag to a cell indicative of the shifted-out pointer and the buffer number.

27. The switching engine as set forth in claim 25, the buffer management module further comprising:
- a return flag module to set a return flag associated with the shifted-out pointer to a first value if the new state indicates at least one available buffer in the buffer group pointed to by the shifted-out pointer, and to a second value different from the first value if the new state indicates no available buffers in the buffer group pointed to by the shifted-out pointer.

28. The switching engine as set forth in claim 27, wherein the first memory device is coupled to the return flag module to store the shifted-out pointer if and only if its associated return flag is the first value.

* * * * *

UNITED STATES PATENT AND TRADEMARK OFFICE
CERTIFICATE OF CORRECTION

PATENT NO. : 6,985,486 B1
DATED : January 10, 2006
INVENTOR(S) : Agrawal

It is certified that error appears in the above-identified patent and that said Letters Patent is hereby corrected as shown below:

Column 11,
Line 33, delete "routine" and insert -- routing --.

Signed and Sealed this

Eighteenth Day of April, 2006

JON W. DUDAS
*Director of the United States Patent and Trademark Office*